(12) United States Patent
Mondal et al.

(10) Patent No.: US 10,599,864 B2
(45) Date of Patent: Mar. 24, 2020

(54) SYSTEMS AND METHODS FOR SENSITIVE AUDIO ZONE REARRANGEMENT

(71) Applicant: Tata Consultancy Services Limited, Mumbai (IN)

(72) Inventors: Sutapa Mondal, Pune (IN); Sumesh Manjunath, Pune (IN); Rohit Saxena, Pune (IN); Manish Shukla, Pune (IN); Purushotam Gopaldas Radadia, Pune (IN); Shirish Subhash Karande, Pune (IN); Sachin Premsukh Lodha, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 765 days.

(21) Appl. No.: 15/071,010

(22) Filed: Mar. 15, 2016

(65) Prior Publication Data

US 2017/0161516 A1    Jun. 8, 2017

(30) Foreign Application Priority Data

Dec. 2, 2015    (IN) .......................... 4552/MUM/2015

(51) Int. Cl.
*G06Q 20/40*    (2012.01)
*G06F 21/62*    (2013.01)
(Continued)

(52) U.S. Cl.
CPC ........ *G06F 21/6245* (2013.01); *G06F 16/245* (2019.01); *G06F 16/686* (2019.01);
(Continued)

(58) Field of Classification Search
CPC .. G06F 21/6245; G06F 16/245; G06F 16/686; G06F 21/602; G06F 21/32;
(Continued)

(56) References Cited

U.S. PATENT DOCUMENTS

| 7,003,501 B2 | 2/2006 | Ostroff |
| 8,345,851 B2 | 1/2013 | Vadlakonda et al. |

(Continued)

FOREIGN PATENT DOCUMENTS

| CN | 2559428 | 7/2003 |

OTHER PUBLICATIONS

Juels, A. et al., "Honey Encryption: Security Beyond the Brute-Force Bound", Advances in Cryptology—EUROCRYPT 2014, Springer Berlin Heidelberg, pp. 293-310, (2014).

(Continued)

*Primary Examiner* — James D Nigh
(74) *Attorney, Agent, or Firm* — Finnegan, Henderson, Farabow, Garrett & Dunner LLP (57) ABSTRACT

Systems and methods for sensitive audio zone rearrangement are provided that protects confidential and sensitive information such as user identifier during query processing and authentication. The sensitive information rearrangement system generates or permutes the actual user identifier in a privacy preserving manner. The sensitive information is extracted from an input being either a speech or DTMF tones, and a virtual user identifier is generated in real time, that is specific to a transaction to be performed, or a query initiation by a user in real-time. The sensitive information is rearranged which can be either DTMF tone or speech of user to generate the virtual user identifier.

13 Claims, 5 Drawing Sheets

(51) Int. Cl.

| | |
|---|---|
| *G06F 16/245* | (2019.01) |
| *G06F 16/68* | (2019.01) |
| *G06F 21/60* | (2013.01) |
| *G10L 15/26* | (2006.01) |
| *G10L 13/00* | (2006.01) |
| *G06Q 10/10* | (2012.01) |
| *G06Q 20/34* | (2012.01) |
| *G06Q 20/38* | (2012.01) |
| *H04L 29/06* | (2006.01) |
| *G06F 21/32* | (2013.01) |

(52) U.S. Cl.
CPC ......... *G06F 21/602* (2013.01); *G06Q 10/105* (2013.01); *G06Q 20/34* (2013.01); *G06Q 20/3821* (2013.01); *G06Q 20/401* (2013.01); *G06Q 20/4014* (2013.01); *G10L 13/00* (2013.01); *G10L 15/26* (2013.01); *H04L 63/0428* (2013.01); *H04L 63/06* (2013.01); *G06F 21/32* (2013.01)

(58) Field of Classification Search
CPC .. G06Q 10/105; G06Q 20/34; G06Q 20/3821; G06Q 20/401; G06Q 20/4014; G10L 13/00; G10L 15/26; H04L 63/0428; H04L 63/06
USPC .......................................................... 705/75
See application file for complete search history.

(56) References Cited

U.S. PATENT DOCUMENTS

| | | | |
|---|---|---|---|
| 8,831,204 B1 | 9/2014 | Pycko et al. | |
| 9,374,221 B1* | 6/2016 | Juels | H04L 9/321 |
| 2008/0077409 A1* | 3/2008 | Sannerud | G10L 17/04 |
| | | | 704/277 |
| 2008/0144787 A1* | 6/2008 | Gantman | H04M 1/68 |
| | | | 379/93.03 |
| 2008/0170693 A1* | 7/2008 | Spies | G06F 21/6209 |
| | | | 380/277 |
| 2011/0228919 A1* | 9/2011 | Tew | H04M 3/38 |
| | | | 379/93.12 |
| 2012/0150748 A1* | 6/2012 | Law | G06Q 20/20 |
| | | | 705/71 |
| 2013/0136242 A1* | 5/2013 | Ross | H04M 3/51 |
| | | | 379/85 |
| 2013/0232503 A1* | 9/2013 | Volvovski | G06F 11/1044 |
| | | | 718/104 |
| 2016/0104145 A1* | 4/2016 | Critchley | G06Q 20/36 |
| | | | 705/41 |
| 2017/0039568 A1* | 2/2017 | Tunnell | G06Q 20/4014 |

OTHER PUBLICATIONS

Tyagi, N. et al., "Honey Encryption Applications: Implementation of an encryption scheme resilient to brute-force attacks", 6.857 Computer & Network Security, Spring 2015, pp. 1-16, (2015).

\* cited by examiner

SYSTEMS AND METHODS FOR SENSITIVE AUDIO ZONE REARRANGEMENT

PRIORITY CLAIM

This U.S. patent application claims priority under 35 U.S.C. § 119 to: India Application No. 4552/MUM/2015, filed on Dec. 2, 2015. The entire contents of the aforementioned application are incorporated herein by reference.

TECHNICAL FIELD

This disclosure relates generally to media processing systems, and more particularly to systems and methods for sensitive audio zone rearrangement.

BACKGROUND

Data privacy is a major concern in any industry where majority of user information deal with sensitive information for example, user details, credit card number, CVV number, account number, and the like, which essentially indicate use of sensitive content connected with data privacy. In a Payment Card Industry (PCI) scenario it is very common to have a phone based customer care support for authentication and query processing, wherein Customer Care Representative (CCR) or agent normally require customer's credit card number and some additional personal information to validate them. Taking into account budget constraints and profitability margins, these setups normally have few or negligible controls which discourage the agents from using customer data for malicious use.

Moreover, for compliance, audit and training purposes these setups employ call recording facilities, which in turn increase data leakage issue manifolds. Customer access their account information or perform transactions either through web portals or interactive voice response (IVR) gateways. Web portal network traffic is normally encrypted and transmitted on secure channels. Apart from the customer, no other human involvement is required. Although this is not applicable to an IVR based system, sometimes, depending on the transaction type or query requirement, an agent needs to be present to assist the customer. The agent can either request the customer to input the credit card number using keypad, which consists of hi band DTMF signals to convey data, or speak it out. In both the input mediums the information being conveyed is structured and is of limited dictionary size. Typically, in the PCI customer care support, authentication and query processing is normally backed by a web or desktop based application, wherein additional customer details are entered, for example, date of birth or phone number, for verification purposes, or customer specific information is displayed for further processing and query answering. This may lead to privacy attacks thereby resulting in targeted advertisement, personal data loss, monetary loss, and, high chance of identity theft for customer. Similarly, the fallout of such data leakage leads to the service provider loss in reputation, customer loss and monetary losses in the form of settlements.

SUMMARY

Embodiments of the present disclosure present technological improvements as solutions to one or more of the above-mentioned technical problems recognized by the inventors in conventional systems. For example, in one embodiment, a a system for sensitive information rearrangement is provided. The system comprising: a memory storing instructions; a sensitive information processor coupled to the memory, wherein the sensitive information processor is configured by the instructions to: obtain, in real time, an input specific to at least one of a transaction and a query initiation from a user, wherein the input is at least one of a speech or dual tone multi frequency (DTMF) tones corresponding to an identity (e.g., an identity card) associated with the user, extract, in the real time, sensitive information specific to the identity of the user from the input, and generate in the real time, a virtual user identifier corresponding to the sensitive information, wherein the virtual user identifier is specific to at least one of the transaction being performed by the user and the query initiation in the real time.

The sensitive information processor performs a honey encryption technique on the sensitive information to generate the virtual user identifier based on a derived key obtained from a master key that is used to perform the encryption, a session identifier specific to the transaction, and cumulative energy of the user in the speech. In an alternative embodiment, the sensitive information processor is further configured by the instructions to perform a cipher block chaining message authentication code (CBCMAC) on the sensitive information to obtain a tag, and perform format preserving encryption, operating in a counter (CTR) and CBCMAC mode, on the sensitive information to generate the virtual user identifier based on a counter value derived from cumulative energy of the user in the speech, and the tag.

The system further comprises a speech engine that comprises a speech regeneration module configured to regenerate the virtual user identifier using a corresponding user speech model each time the user performs a transaction or initiates a query for processing. The speech regeneration module is further configured to extract (i) a first set of letters from the input present in the identity, and (ii) a second set of letters from the input to obtain the sensitive information, generate a remapping table based on the first set of letters and the second set of letters, and rearrange, using the remapping table, the sensitive information to generate the virtual user identifier for performing the transaction. The virtual user identifier is generated as at least one of a speech of the user and DTMF tones each time the user performs a transaction or initiates a query for processing. The sensitive information is extracted using a keyword spotting technique.

The system further comprises a notification agent that is configured to compute a score for the speech obtained in real time, perform a comparison of the score with a corresponding user speech model, and trigger an action based on the comparison, wherein the action comprises a notification message being communicated to a communication device associated with the user. The user is authenticated when the score is greater than a predefined threshold.

In another embodiment, a method for sensitive information rearrangement is provided. The method comprising: obtaining, in real time, a using sensitive information processor, an input specific to at least one of a transaction and a query initiation from a user, wherein the input is at least one of a speech or dual tone multi frequency (DTMF) tones corresponding to an identity associated with the user; extracting, in the real time, sensitive information specific to the identity of the user from the input; and generating in the real time, a virtual user identifier corresponding to the sensitive information, wherein the virtual user identifier is specific to the at least one of the transaction being performed by the user and the query initiation in the real time.

The computer implemented method further comprises performing, using the sensitive information processor, a honey encryption technique on the sensitive information to generate the virtual user identifier based on a derived key obtained from a master key that is used to perform the encryption, a session identifier specific to the transaction, and cumulative energy of the user in the speech. The computer implemented method further comprises performing a cipher block chaining message authentication code (CBCMAC) on the sensitive information to obtain a tag; and performing format preserving encryption, operating in a counter (CTR) and CBCMAC mode, on the sensitive information to generate the virtual user identifier based on a counter value derived from cumulative energy of the user in the speech, and the tag.

The computer implemented method further comprises regenerating, using a speech regeneration module stored in a speech engine, the virtual user identifier using a corresponding user speech model each time the user performs a transaction or initiates a query for processing. The computer implemented method further comprises extracting, using the speech regeneration module, (i) a first set of letters from the input present in the identity, and (ii) a second set of letters from the input to obtain the sensitive information; generating a remapping table based on the first set of letters and the second set of letters; and rearranging, using the remapping table, the sensitive information to generate the virtual user identifier for performing the transaction or for initiating the query for processing.

The virtual user identifier is generated as at least one of a speech of the user and DTMF tones each time the user performs a transaction and/or initiates a query for processing. The sensitive information is extracted using a keyword spotting technique. The computer implemented method further comprises computing using notification agent, a score for the speech obtained in real time; performing a comparison of the score with a corresponding user speech model; and triggering an action based on the comparison, wherein the action comprises a notification message being communicated to a communication device associated with the user. The user is authenticated when the score is greater than a predefined threshold.

In yet another embodiment, one or more non-transitory machine readable information storage mediums comprising one or more instructions is provided, which when executed by one or more hardware processors causes sensitive information rearrangement by obtaining, in real time, using a sensitive information processor, an input specific to at least one of a transaction and a query initiation from a user, wherein the input is at least one of a speech or dual tone multi frequency (DTMF) tones corresponding to an identity associated with the user; extracting, in the real time, sensitive information specific to the identity of the user from the input; and generating in the real time, a virtual user identifier corresponding to the sensitive information, wherein the virtual user identifier is specific to at least one of the transaction being performed by the user and the query initiation in the real time.

The one or more instructions, which when executed by one or more hardware processors further causes performing, using the sensitive information processor, a honey encryption technique on the sensitive information to generate the virtual user identifier based on a derived key obtained from a master key that is used to perform the encryption, a session identifier specific to the transaction, and cumulative energy of the user in the speech. The one or more instructions, which when executed by one or more hardware processors further causes performing a cipher block chaining message authentication code (CBCMAC) on the sensitive information to obtain a tag; and performing format preserving encryption, operating in a counter (CTR) and CBCMAC mode, on the sensitive information to generate the virtual user identifier based on a counter value derived from cumulative energy of the user in the speech, and the tag.

The one or more instructions, which when executed by one or more hardware processors further causes regenerating, using a speech regeneration module stored in a speech engine, the virtual user identifier using a corresponding user speech model each time the user performs a transaction or initiates a query for processing. The one or more instructions, which when executed by one or more hardware processors further causes extracting, using the speech regeneration module, (i) a first set of letters from the input present in the identity, and (ii) a second set of letters from the input to obtain the sensitive information; generating a remapping table based on the first set of letters and the second set of letters; and rearranging, using the remapping table, the sensitive information to generate the virtual user identifier for performing the transaction or initiates the query for processing.

The virtual user identifier is generated as at least one of a speech of the user and DTMF tones each time the user performs a transaction or initiates a query for processing. The sensitive information is extracted using a keyword spotting technique. The one or more instructions, which when executed by one or more hardware processors further causes computing using notification agent, a score for the speech obtained in real time; performing a comparison of the score with a corresponding user speech model; and triggering an action based on the comparison, wherein the action comprises a notification message being communicated to a communication device associated with the user. The user is authenticated when the score is greater than a predefined threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIG. 1 through 5, where similar reference characters denote corresponding features consistently throughout the figures, there are shown preferred embodiments and these embodiment are described in the context of the following exemplary system and/or method.

Figure 1:
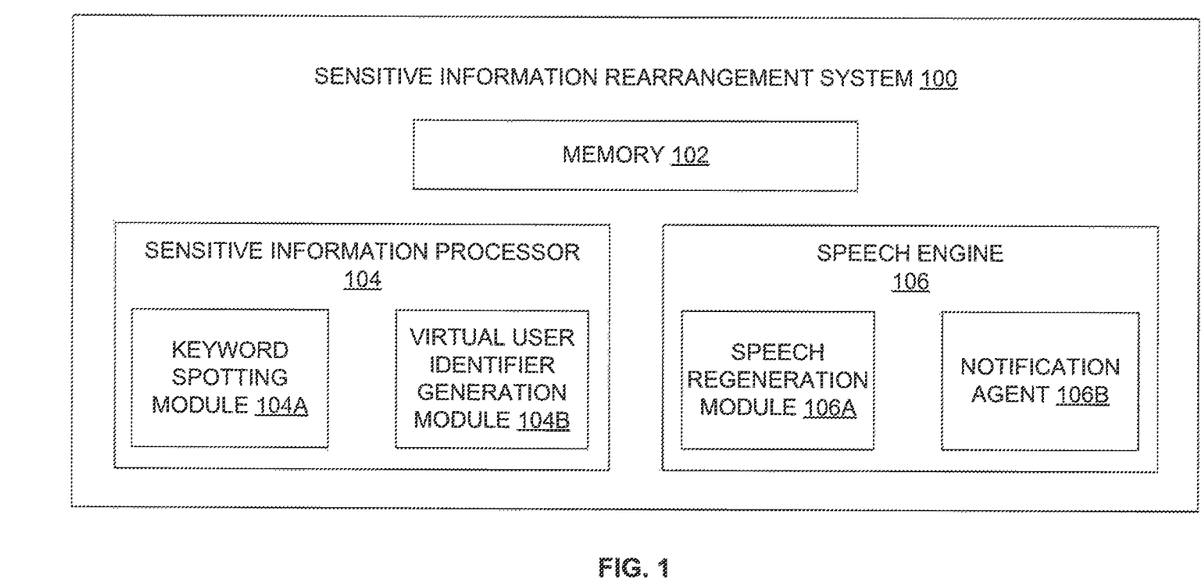
FIG. 1 is a block diagram of a sensitive information rearrangement system according to one or more embodiments of the present disclosure.

FIG. 1 is a block diagram of a sensitive information rearrangement system 100 according to one or more embodiments of the present disclosure. The sensitive information rearrangement system 100 comprises a memory 102, a sensitive information processor 104, and a speech engine 106. The terms "sensitive information rearrangement system" and system may be interchangeably used herein. The memory 102 stores instructions, and optionally, one or more speeches specific to one or more users. The sensitive information processor 104 is coupled to the memory 102. The sensitive information processor 104 is configured by the instructions to obtain, in real time, an input from a user. The input is at least one of a speech or dual tone multi frequency (DTMF) tones corresponding to an identity (e.g., identity card) or information associated with the user. The sensitive information processor 104 extracts, in real time, sensitive information specific to the user from the input, and further generates in real time, a virtual user identifier corresponding (or specific) to the sensitive information. The virtual user identifier is specific to a transaction being performed by the user in real time. The virtual user identifier can be utilized in query processing during the transaction.

The sensitive information rearrangement system 100 includes a virtual audio driver (not shown in FIG. 1), which redirects the audio packets (e.g., speech) or the DTMF tones to the sensitive information processor 104. The virtual audio driver operates in a kernel space, whereas the sensitive information processor 104 operates in a user space where an input audio buffer (not shown in FIG. 1) takes the audio packets (e.g., speech) or the DTMF tones coming from the kernel space and an output audio buffer (not shown in FIG. 1) is responsible for routing out the processed audio to a playback device.

The sensitive information processor 104 extracts the sensitive information from the input by performing keyword spotting technique on the input. The sensitive information processor 104 includes a keyword spotting module 104A that detects one or more sensitive threads (or sensitive information) in an audio. A number of approaches can be followed for detecting the sensitive information. The sensitive information comprises, but is not limited to, a payment card identifier such as a debit card number, an ATM card number, a credit card number, a loyalty card number, a user identifier from an identity card such as permanent account number, bank account number, national security number, driving license number, a product number, a mobile number, and the like.

The sensitive information processor 104 implements the keyword spotting module 104A which when executed in real time filters out the incoming audio packets thereby improving the system performance. Consider where the user enters a payment card number (e.g., a credit card number) when the user initiates a call with a service provider (e.g., a financial institution). The user enters or voices out the credit card number. For example, in case of credit card, the credit card number being the sensitive, keyword spotting could be utilized to identify (or extract) the sensitive information (e.g., the credit card number be in terms of speech or DTMF tones) which may lie between two keywords, for example, asterisk (*), and hash (#), etc. Therefore, when the first special character (e.g., asterisk (*)) is encountered, the keyword spotting module 104A is turned on and when the last character is encountered it is turned off. Thus, the keyword spotting module 104A extracts the original credit card number. The sensitive information (e.g., the original credit card number) is detected based on the length of the sensitive field and at the same time monitoring the sequence of keywords for identification, thereby maintaining a real time performance for detection.

The sensitive information processor 104 further comprises a virtual user identifier generation module 104B that maintains the privacy and security of the system 100. Information like credit card number, is sensitive data for the user (e.g., a customer) and the leakage of this information will cost loss to the customer. Therefore, the virtual user identifier generation module 104B generates a virtual user identifier (e.g., a virtual credit card number) corresponding to the credit card number to safeguard the original credit card number such that the corresponding transaction or query processing is carried out smoothly without revealing original information to customer care executives. Likewise, the virtual user identifier generation module 104B generates virtual user identifiers for other sensitive information extracted by the sensitive information rearrangement system 100. The sensitive information rearrangement system 100 implements one or more approaches (or techniques) as described below for generating the virtual user identifier:

The sensitive information rearrangement system 100 implements a pseudo random number generator for generating sequence of numbers whose properties approximate the properties of sequences of random numbers. Initially, the sensitive information rearrangement system 100 requires a seed value to generate the random number which means for every different seed value a corresponding random number is generated. The sensitive information rearrangement system 100 implements the pseudo random number generator methodology for generating seed value each time to generate a virtual user identifier in the following way:

$$Seed = s \oplus z \oplus E,$$

where, s is a session identifier (SID), z represents user identifier (e.g., a registered phone number, and E is cumulative speech energy of the user. The cumulative speech energy is the total speech energy involved in the conversation before the user enters or speaks out the user identifier (e.g., a credit card number). It is to be noted, that this energy may vary (or differ) for each instance of transaction hence ensuring a good entropy. The sensitive information processor 104 performs a honey encryption technique on the sensitive information to generate the virtual user identifier based on a derived key obtained from a master key that is used to perform encryption, a session identifier specific to the transaction, and cumulative energy of the user in the speech.

The sensitive information processor 104 performs the honey encryption technique to prevent an attacker from attempting to decrypt messages (or sensitive information)

using incorrect key. This makes difficult for the attacker to guess the correct message. Key 'K' used for encryption is termed as master Key and keys '$k_i$' are termed as derived keys, which are derived using following function f(x):

$$k_i = F(x),$$

F(x)=K⊕s⊕E, where s is the session ID and E is the cumulative speech energy. Thus, with honey encryption technique being the baseline, each time a new virtual user identifier is generated by using at least one derived key which is different from the master key.

Similarly, the sensitive information processor 104 is configured by the instructions to perform a cipher block chaining message authentication code (CBCMAC) on the sensitive information to obtain a tag, and perform Format Preserving Encryption (FPE) on the sensitive information to generate the virtual user identifier based on cumulative energy of the user in the speech, and the tag. The sensitive information processor 104 implements the FPE technique (or a FPE generator) to improve its performance using a CCM (Counter with CBC-MAC) mode of operation for block ciphers and incorporating cumulative speech energy in order to enhance security. Below example, illustrates a pseudo code which is used by the virtual user identifier generation module 104B to generate a virtual user identifier specific to a user to perform one or more transactions, and query processing.

```
Function perform FPE (E, S, Z, UID)
Input:   E — Speech Energy
         S — Session ID
         Z — user registered mobile/telephone number
         UID — user identifier (e.g., credit card number (CC))
Returns: VUID, virtual user identifier (e.g., virtual credit card number
(VCC))
      1. Tag        ← Perform CBCMAC (CC)
      2. K          ← GetKey( )
      3. Counter    ← E ⊕ X ⊕ S
      4. N          ← FPEGenerator (Counter, CC, Tag, K)
      5. If N ∉ R, Range of N having n-digit numbers then
            Counter      ← Counter + 1
            Go to 4
      6. VUID       ← N
      7. Return VUID
      8. End
```

As described in the above pseudo code, the sensitive information processor 104 takes the credit card number as an input and performs a cipher block chaining message authentication code on it. GetKey enables to retrieve a secret key shared between the sensitive information rearrangement system 100 and a financial institution. The FPEGenerator takes a counter value, the credit card number, calculated tag, and the key as input to perform format preserving encryption on the original credit card in CCM mode. Following pseudo code is provided for virtual user identifier (VCC) generation:

```
Function GenerateVCC (CC)
Input: User identifier (e.g., credit card number (CC))
Returns: virtual user identifier (VUID) (e.g., a virtual credit card number
(VCC))
      1. E     ← GetSpeechEnergy( )
      2. S     ← GetSessionID( )
      3. Z     ← GetUserAttribute( )
      4. VUID  ← PerformMapping(E, S, Z, UID)
      5. Return VUID
      6. End
```

The speech engine 106 performs one or more speech analytics on speech of the user. The speech engine 106 comprises a speech regeneration module 106A that is configured to regenerate the virtual user identifier using a corresponding user speech model each time the user performs a transaction or initiates a query for processing. The corresponding user speech model may either be stored in a local memory (e.g., the memory 102), or stored in the speech engine 106. Alternatively, the corresponding user speech model may be obtained from one or more sources (e.g., from the cloud, or any external entity who is authorized by an issuing entity to store speech models of one or more users).

As can be seen from the above pseudo code, the Perform-Mapping method is where any of the approaches can be plugged in as per the system scenario to generate virtual user identifier (e.g., a virtual credit card number). The above mentioned approaches do take into consideration that a speech synthesis model is present which is able to regenerate any letter (e.g., digit) in respective user's voice in the virtual credit card number.

Apart from the above mentioned approaches, the sensitive information rearrangement system 100 considers a realization of generating the virtual user identifier based on the fact that the user speech for the original identity card (e.g., credit card number) is reused to rearrange the sensitive information (e.g., sensitive audio part each time the user visits for transaction). The mapping of the original credit card number to virtual credit card number is based on reutilization of digits contained in the user speech. Thus, the sensitive information rearrangement system 100 implements the speech regeneration module 100E that is further configured to extract (i) a first set of letters (e.g., digits in case of credit card, alphanumeric in case on PAN, and the like) from the input present in the identity card, and (ii) a second set of letters from the input to obtain the sensitive information, generate a remapping table based on the first set of letters and the second set of letters, and then further rearrange, using the remapping table, the sensitive information to generate the virtual user identifier for performing the transaction.

Assuming that the sensitive information rearrangement system 100 initially does not hold any speech synthesis model for each and every user registered with the system 100. In such cases, the sensitive information rearrangement system 100 generates a virtual user identifier in a manner that the rearrangement of the digits in the original credit card number is done based on remapping table generated. This way the rearrangement of the sensitive information (e.g., sensitive audio zone) is achieved by reusing and rearranging speech input of the user. Below example illustrates pseudo code for implementing speech remap technique and generating remapping table to rearrange the speech input of the user:

```
Function SpeechRemap (User identity Card (UID) — CC)
Input: CC — Original Credit card number
Returns: VUID — such as VCC, Virtual credit card number
      1. Create array num[ ]
      2. Initialize num[ ]      ← StoreDigitsInCC (CC)
      3. Create array minus[ ]
      4. Initialize minus[ ]    ← StoreDigitsNotInCC (num[ ], minus[ ])
      5. RemapTable[ ]          ← GenerateRemapTable(minus[ ])
      6. VCC                    ← Rearrangement(RemapTable[ ], CC)
      7. Returns VCC
      8. End.
```

As described in the above pseudo code, the speech regeneration module 106A extracts a first set of letters (e.g., digits) present in the credit card and stores them in an array. The speech regeneration module 106A further extracts a second set of letters (e.g., digits) not present in the credit card and stores them in another array. The speech regeneration module 106A then generates the remapping table to obtain the virtual credit card number using the first set of letters and/or the second set of letters. The remapping table is then utilized by the speech regeneration module 106A to perform the final mapping on the original credit number by performing the rearrangement based on the remapping table. Similarly, the speech regeneration module 106A extracts letters accordingly based on the type of identity card (e.g., other than credit card such as PAN, driver license, and the like). Example of pseudo code for generating a remapping table is given below:

```
Function GenerateRemapTable (minus[ ])
  Input: minus [ ] — an array containing letters (e.g., digits) not in
identity card (e.g., Credit Card)
  Returns: RemapTable [ ] — an array containing mapping for virtual
user
identifier (e.g., virtual credit card number (VCC))
    1. Initialize L  ← 10
    2. Set RemapLength = L — LengthOf(minus[ ])
    3. Create array RemapTable[RemapLength]
    4. For i = 0 to RemapLength−1
        Y = I
        do {
            x = random (10);
        } while (! FixDigit (x, minus, y));
        RemapTable[i] = x;
    5. Return RemapTable
    6. End
```

As depicted from the above pseudo code, FixDigit method (or technique) ensures the mapping in such a manner that the digits not present in the original credit card number are not set for the mapping of current digit, and the current digit is not mapped to itself. Example of pseudo code for the FixDigit technique used herein is as below:

```
Function FixDigit (x, minus, y)
    Inputs: x — the random number generated
        minus — an array containing letters not in identity card, y,
        Y — current number for mapping
    Returns: Boolean
        1. Initialize ctr  ← 0
        2. For j = 0 to length (minus)−1
            If (x == minus, Get (j) || x == y) {
                Return false;
            }
        3. Return true
        4. End
```

As can be seen from the above implementation of pseudo code, the virtual user identifier (e.g., virtual credit card number) is generated as at least one of a speech of the user and DTMF tones each time the user performs a transaction. The sensitive information is extracted using a keyword spotting technique for the one or more approaches/techniques described above (e.g., pseudo random number generator, honey encryption, format preserving encryption, and the like) to rearrange the sensitive information and generate the virtual user identifier.

The speech engine 106 further includes a notification agent 106B that computes a score for the speech, and performs a comparison of the score with a corresponding user speech model. Based on the comparison, the notification agent 106B triggers an action. The action comprises, but is not limited to, a notification message being communicated to a communication device (e.g., a mobile communication device, a personal computer, and the like) associated with the user. The notification message is transmitted via at least one network using one or more messaging services (e.g., email, short message service (SMS), multimedia message service (MMS), a call, an audio, a video, and the like). The speech engine 106 authenticates the user when the score is greater than a predefined threshold stored in the speech engine 106 (or the memory 102). The predefined threshold may be obtained from the one or more sources (as described above). The notification agent 106E generates event(s) in a form of an alert code to be transmitted to the communication device of the user (e.g., the customer's registered phone number) when there is a denial in authentication. The user is authenticated during a transaction or while he/she initiates a query for processing.

The notification agent 106B enables and implements a security feature by way of above authentication where thefts done by stolen identity cards can be minimized as well as mitigates masquerade attacks. This ensures that the user is registered to the sensitive information rearrangement system 100 to prevent theft(s) and malicious attack(s). The users' speech samples may be collected (or obtained) at the time of registration With the sensitive information rearrangement system 100 (or with a service provider issuing identity card) to create one or more user speech models. Moreover, each time the user revisits for any subsequent transactions, the user speech model is enhanced by capturing additional speech features from the corresponding successful transactions. Further, the sensitive information rearrangement system 100 performs auditing because of the session management performed at individual level, which maintains the references of the entities involved in the transaction or query processing. Thus easy detection of a malicious entity is possible.

During an implementation of the above approach, one assumption being made is that only few digits are missing in the original credit card number. In order to formulate this assumption, a coupon collector technique is implemented as below:

Suppose that the length of credit card number is m, and let n be the distinct digit in credit card of length m then, $$n \ln n = m$$

Therefore, with n distinct digits present in credit card number the possible number of remap tables for each credit card number is given by $(n-1)^n$. Since the remapping table is chosen randomly, the probability of generating the same remapping table is $$\frac{1}{(n-1)^n},$$

hence the chances of generating the same virtual credit card number is negligible.

The keyword spotting module 104A, the virtual user identifier generation module 104B, the speech regeneration module 106A, and the notification agent 106B are implemented as at least one of a logically self-contained part of a software program, a self-contained hardware component, and/or, a self-contained hardware component, with a logically self-contained part of a software program embedded into each of the hardware component that when executed perform the above method described herein, in one embodiment. Although, for better understanding of the embodiments described herein, the present disclosure illustrate credit card number by way of example and implementation of the sensitive information rearrangement system 100 in achieving data privacy for financial solutions in financial institutions, the sensitive information rearrangement system 100 can be implemented in other sectors/industries (or technological domains), and are not limited to, for example, Income Tax (IT) Department for query processing on, or transactions related to, IT returns, gas distribution systems, water supplying systems, utility bill payments, educational institutes, background verification of candidates/employees, and the like, where protecting sensitive information pertaining to a user is critical.

Figure 2:
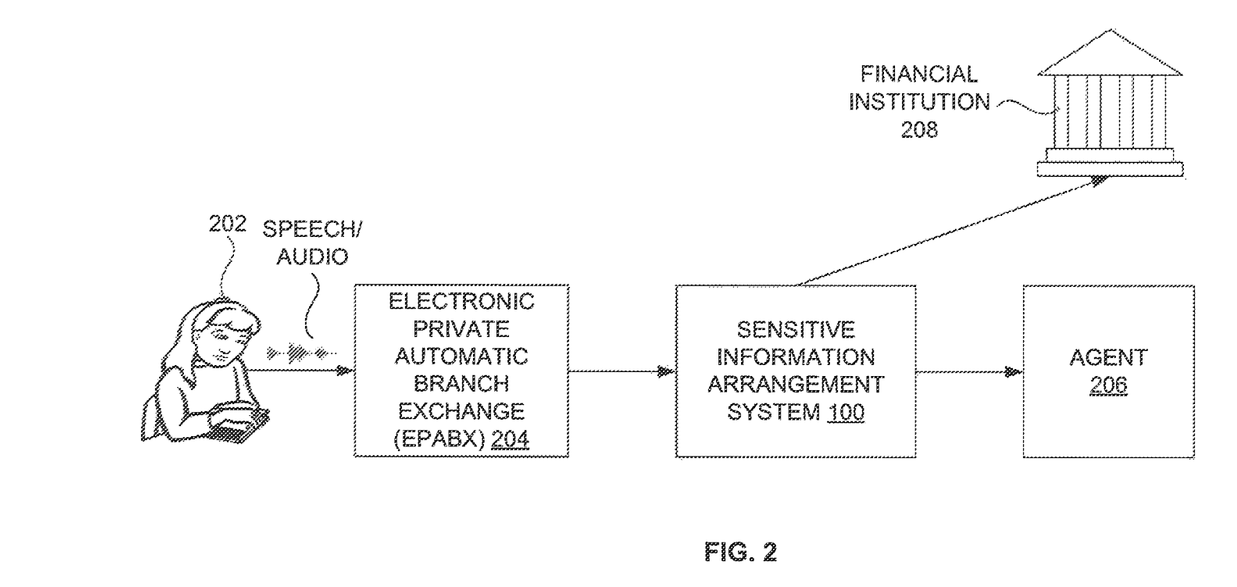
FIG. 2 illustrates an implementation of the sensitive information rearrangement system of FIG. 1 in a financial institute transaction scenario according to one or more embodiments of the present disclosure.

AG. 2, with reference to FIG. 1, illustrates an implementation of the sensitive information rearrangement system 100 in a financial institute transaction scenario according to one or more embodiments of the present disclosure. In particular, FIG. 2 depicts a query processing financial institute scenario where a user 202 (e.g., a customer) initiates a call for query related to an identity card (e.g., a credit card), where the user 202 is requested to either enter user identifier (e.g., credentials such as credit card number) on keypad (DTMF tones) or speak out the credentials. The sensitive information rearrangement system 100 receives the credit card details through an Electronic Private Automatic Branch Exchange (EPABX) 204, and then generates a virtual credit card number. The financial institution 208 then decrypts the VCC with shared secret key. Further, the financial institution 208 sends a confirmation to an agent 206 for transaction verification. The implementation of the sensitive information rearrangement system 100 in the financial institute transaction scenario (or any transaction scenario) enables to obfuscate the sensitive information such that the agent 206 (at the receiving end such as a customer executive representative) is unaware of confidential sensitive information (e.g., the original credit card number) and the query processing is successfully completed based on the generated information mapped to the sensitive information.

Figure 3:
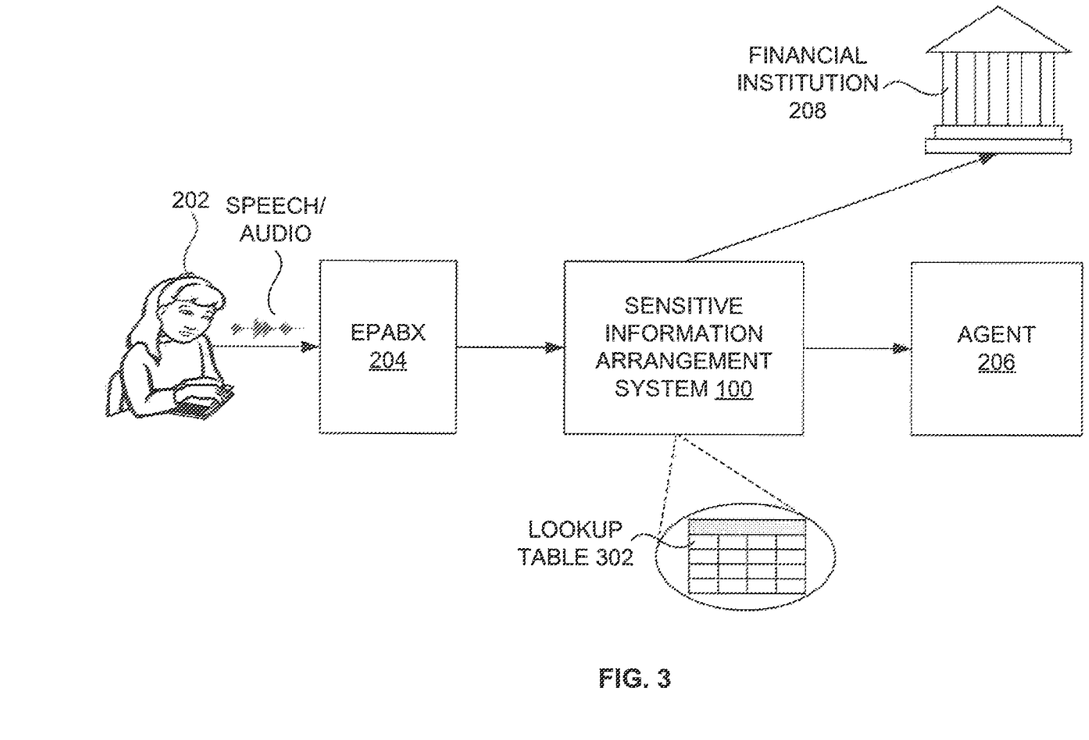
FIG. 3 an implementation of the sensitive information rearrangement system of FIG. 1 in a transaction processing scenario based on Honey Encryption according to one or more embodiments of the present disclosure.

FIG. 3, with reference to FIGS. 1 and 2, an implementation of the sensitive information rearrangement system 100 in a transaction processing scenario based on Honey Encryption according to one or more embodiments of the present disclosure. The sensitive information rearrangement system 100 incorporates a LookUp table (or a LookUp cache) 302 which retains the cipher text obtained from the honey encryption performed on the original user identifier (e.g., original credit card number) along with the customer ID and session ID. Therefore, when the user 202 revisits or initiates a call for transaction or query processing, the sensitive information rearrangement system 100 can retrieve information from the LookUp table 302 and generate a corresponding virtual user identifier, and further updates the LookUp table 302 with a current session ID, wherein the virtual user identifier (e.g., the VCC) is sent to the agent 206. The agent 206 in order to complete the transaction sends the VCC to a corresponding financial institution (e.g., the financial institution 208) based on the information populated on a display screen pertaining to the user. The financial institution 208 then decrypts the VCC with shared secret key and sends a confirmation to the agent 206 for transaction verification. This scenario is therefore flexible enough to be deployed at any of transaction or query processing systems (e.g., at agent's desktop such as customer executive representative end or EPBAX, or at financial institution's end).

Figure 4:
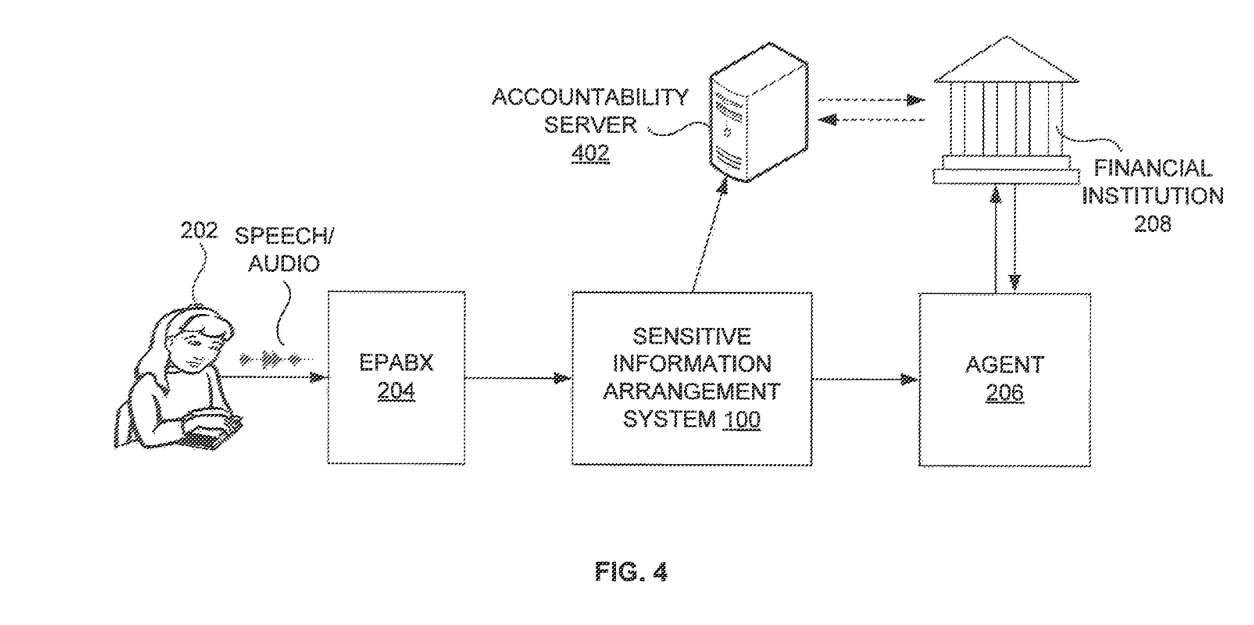
FIG. 4 illustrates an implementation of the sensitive information rearrangement system of FIG. 1 in a transaction processing scenario based on Format Preserving Encryption according to one or more embodiments of the present disclosure.

FIG. 4, with reference to FIGS. 1 through 3, illustrates an implementation of the sensitive information rearrangement system 100 in a transaction processing scenario based on Format Preserving Encryption according to one or more embodiments of the present disclosure. The above scenario includes the EPBAX 204, the sensitive information rearrangement system 100, an accountability server 402, the agent 206, and the financial institution 208. As depicted in FIG. 4, it could be deployed at EPBAX end and the agent's desktop end. This provides the flexibility to act as a third party where the secret key sharing is done for each customer between the sensitive information rearrangement system 100 and the financial institution 208 for each transaction. Hence, this discards the possibility of reusing the key therefore mitigating various attacks. This scenario plays vital role where transaction is taking place using credit card number and financial institution 208 being the third party. The sensitive information rearrangement system 100 being independent of the financial institution 208 complete the transaction without revealing the original credit card number. In order to accomplish the transaction, the virtual credit card number is considered as an operable data in the network keeping the original credit card number secure, thereby maintaining privacy.

The accountability server 402 in the above scenario performs verification and authentication of the virtual credit card number generated by the sensitive information rearrangement system 100. A secure connection may be established between the accountability server 402 and the financial institution 208 in order to mitigate various attacks.

As described above, the sensitive information rearrangement system 100 generates a virtual user identifier (e.g., the VCC in this case), and calculates tag/Hash of original credit card number. The tag is then sent along with Customer ID and Session ID to the accountability server 402, whereas the VCC is sent to the agent 206 (e.g., a customer executive representative). The agent 206 in order to complete the transaction sends the VCC to a corresponding financial institution (e.g., the financial institution 208) based on the information populated on a display screen pertaining to the user. The financial institution 208 then decrypts the VCC with shared secret key and calculates the tag. The tag is then verified by the accountability server 402. The accountability server 402 transmits a response message indicative of authentication or denial. Further, the financial institution 208 sends a confirmation to the agent 206 for transaction verification. This ensures that the transaction is completed successfully where the operable data being the VCC number. Although, FIGS. 2 through 4, depict the sensitive information rearrangement system 100 between the EPBAX 204 and the agent 208, the sensitive information rearrangement system 100 can reside or be deployed on an interactive voice response (IVR), can be maintained by a financial institution, or may reside at the agent's side.

Figure 5:
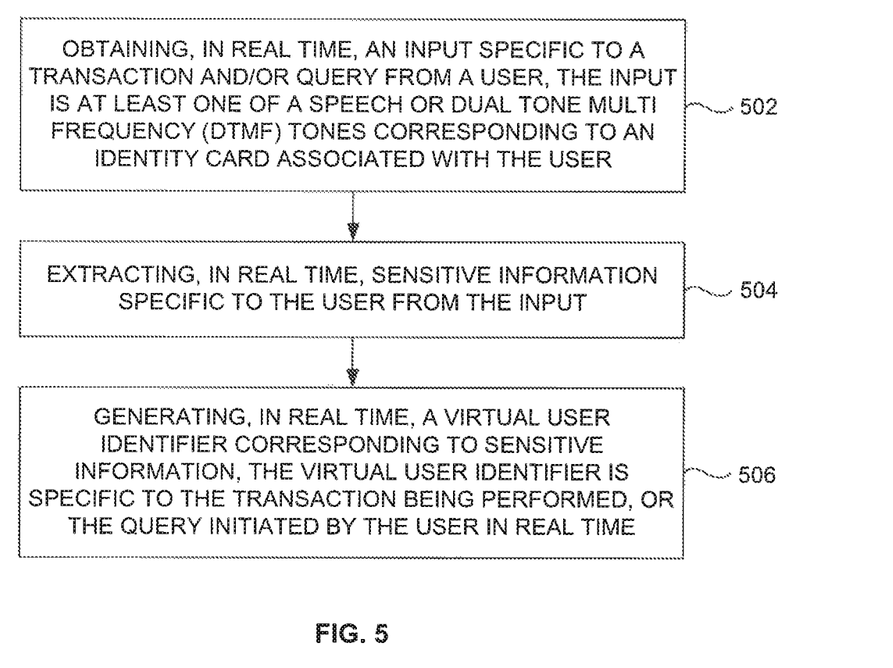
FIG. 5 is a flow diagram illustrating a sensitive information rearrangement method using the sensitive information rearrangement system of FIG. 1 according to one or more embodiments of the present disclosure.

FIG. 5, with reference to FIGS. 1 through 4, is a flow diagram illustrating a sensitive information rearrangement method using the sensitive information rearrangement system 100 of FIG. 1 according to one or more embodiments of the present disclosure. The method includes: obtaining (502), in real time, using the sensitive information processor 104, an input specific to a transaction and/or a query initiation from a user. The input is at least one of a speech or dual tone multi frequency (DTMF) tones corresponding to an identity associated with the user. The method further includes extracting (504), in the real time, sensitive information specific to the identity of the user from the input; and generating (506), in the real time, a virtual user identifier corresponding to the sensitive information. The virtual user identifier is specific to the transaction being performed and/or the query initiated by the user in the real time.

The method further includes performing, using the sensitive information processor 104, a honey encryption technique on the sensitive information to generate the virtual user identifier based on a derived key obtained from the master key used in encryption, a session identifier specific to the transaction, and cumulative energy of the user in the speech. The method further performing a cipher block chaining message authentication code (CBCMAC) on the sensitive information to obtain a tag; and performing format preserving encryption on the sensitive information to generate the virtual user identifier based on a counter value derived from cumulative energy of the user in the speech, and the tag.

The method further includes regenerating, using the speech regeneration module 106A stored in the speech engine 106, the virtual user identifier using a corresponding user speech model each time the user performs a transaction and/or initiates a query for processing. The method further includes extracting, using the speech regeneration module 106A, (i) a first set of letters from the input present in the identity, and (ii) a second set of letters from the input to obtain the sensitive information; generating a remapping table based on the first set of letters and the second set of letters; and rearranging, using the remapping table, the sensitive information to generate the virtual user identifier for performing the transaction and/or for initiating the query for processing.

The virtual user identifier is generated as at least one of a speech of the user and DTMF tones each time the user performs a transaction and/or initiates a query for processing. The sensitive information is extracted using a keyword spotting technique that is implemented using the keyword spotting module 104A. The method further includes computing using a notification agent 106B, a score for the speech obtained in real time; performing a comparison of the score with a corresponding user speech model; and triggering an action based on the comparison. The action includes a notification message that is communicated to a communication device associated with the user. The user is authenticated when the score is greater than a predefined threshold.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of the present disclosure provides a sensitive information rearrangement system and method for generating a virtual user identifier for a specific transaction or query processing associated with a user (e.g., customer), The sensitive information rearrangement system 100 implements the virtual user identifier generation module 104B that generates a virtual user identifier in real time specific to a transaction or query processing. The sensitive information rearrangement system 100 further implements the speech regeneration module 106A recreates the customer voice to playback the virtual user identifier generated by the sensitive information rearrangement system 100. The speech regeneration module 106A utilizes one or more speech data models of the customer (residing in the speech engine 106) for the recreation of the speech/audio corresponding to the virtual user identifier generated by the sensitive information rearrangement system 100.

Further, it can be visualized as a layer of text to speech engine performing the customer speech regeneration only for the part of speech containing the user identifier. It helps ensuring the adaptability of the sensitive information rearrangement system 100 in the current scenario which makes the sensitive information rearrangement system 100 in its entirety more realistic. A simple implementation of it can be where all pre-recorders of the numbers from 0-9 in customer voice is stored in the sensitive information rearrangement system 100 to synthesize a number string in customer voice. Hence, speech regeneration module 106A acts as a privacy enhancer where an agent is unaware of original sensitive information related to customer instead he/she is dealing with a pseudo information.

The sensitive information rearrangement system 100 protects the confidential and sensitive information (e.g., credit card number of customers) during query processing and authentication, by implementing a real-time technique that can either generate or permute the actual card numbers in a privacy preserving manner. Further it rearranges the sensitive audio which can be either DTMF or speech of the customer as well as avoids data inconsistency by displaying the generated virtual information. Therefore, in terms of audio and visual feel, the suggested technique also maintain the user experience on both the ends. The sensitive information rearrangement system 100 keeps track of one or more entities (e.g., customer, financial institution, agent(s), and the like) in the scenario in order to trace any kind of malicious activity taking place. Moreover, the sensitive information rearrangement system 100 does not store any confidential information of the customer and it also raises notifications to the user in case of authentication denial.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure, A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for sensitive audio zone rearrangement, the system comprising:
  a memory storing instructions;
  a sensitive information processor coupled to the memory, wherein the sensitive information processor is configured by the instructions to:
    obtain, in real time, a first input and a second input, the first input being a conversation, the conversation comprising at least one of a recorded user speech and a speech energy involved in the conversation, and the second input being sensitive information associated with a user and obtained via at least one of speech and dual tone multi frequency (DTMF) tones, the speech and the DTMF tones corresponding to an identity associated with the user, and wherein the sensitive information corresponds to at least one of user details, a credit card number, a card verification value (CVV) number and an account number;
    extract, in real time, sensitive information specific to the identity of the user from the first input and the second input; and
    generate, in real time, a virtual user identifier corresponding to the sensitive information using a corresponding user speech model when the user performs the transaction or initiates the query for processing, wherein the virtual user identifier is generated by:
      extracting (i) a first set of letters from the first input and the second input present in the identity, and (ii) a second set of letters from the first input and the second input to obtain the sensitive information,
      generating a remapping table based on the first set of letters and the second set of letters, and
      rearranging, by the remapping table, the sensitive information to generate the virtual user identifier for performing at least one of a transaction and initiating the query for processing, wherein the virtual user identifier is specific to the transaction being performed by the user or the query initiation in real time.

2. The system of claim 1, wherein the sensitive information processor performs a honey encryption technique on the sensitive information to generate the virtual user identifier, wherein said virtual user identifier is generated using at least one derived key, the at least one derived key being different from a master key, the master key configured to perform the encryption, wherein the virtual user identifier is further based on a session identifier specific to the transaction, and wherein the virtual user identifier is based on a cumulative speech energy of the user in the speech, and wherein the cumulative speech energy is a total energy involved in the conversation before the user enters or speaks out the user identifier.

3. The system of claim 2, wherein the sensitive information processor is further configured by the instructions to:
  perform a cipher block chaining message authentication code (CBCMAC) on the sensitive information to obtain a tag, and
  perform format preserving encryption on the sensitive information to generate the virtual user identifier based on a counter value derived from the cumulative speech energy of the user in the speech, and the tag.

4. The system of claim 1, wherein the virtual user identifier is generated as at least one of a speech of the user and DTMF tones each time the user performs a transaction or initiates a query for processing.

5. The system of claim 1, wherein the sensitive information is extracted using a keyword spotting technique.

6. The system of claim 1, wherein the sensitive information processor is further configured by the instructions to:
  compute a score for the speech obtained in real time;
  perform a comparison of the score with a corresponding user speech model each time the user performs a transaction or initiates a query for processing, wherein the corresponding user speech model is obtained from an external entity authorized by an issuing entity to store speech models of one or more users; and
  trigger an action based on the comparison, wherein the action comprises a notification message being communicated to a communication device associated with the user, wherein the user is authenticated when the score is greater than a predefined threshold.

7. A computer implemented method for sensitive audio zone rearrangement, the method comprising:
  obtaining, in real time, using a sensitive information processor, a first input and a second input, the first input being a conversation, the conversation comprising at least one of a recorded user speech and a speech energy involved in the conversation, and the second input being sensitive information associated with a user and obtained via at least one of speech and dual tone multi frequency (DTMF) tones, the speech and the DTMF tones corresponding to an identity associated with the user, and wherein the sensitive information corresponds to at least one of user details, a credit card number, a card verification value (CVV) number and an account number;
  extracting, in real time, sensitive information specific to the identity of the user from the first input and the second input; and
  generating in real time, a virtual user identifier corresponding to the sensitive information using a corresponding user speech model when the user performs the transaction or initiates the query for processing, wherein the virtual user identifier is generated by:
    extracting (i) a first set of letters from the first input and the second input present in the identity, and (ii) a second set of letters from the first input and the second input to obtain the sensitive information,
    generating a remapping table based on the first set of letters and the second set of letters, and
    rearranging, by the remapping table, the sensitive information to generate the virtual user identifier for performing at least one of a transaction and initiating the query for processing, wherein the virtual user identifier is specific to the transaction being performed by the user or the query initiation in real time.

8. The computer implemented method of claim 7, further comprising performing, using the sensitive information processor, a honey encryption technique on said sensitive information to generate said virtual user identifier, wherein the virtual user identifier is generated using at least one derived key, the at least one derived key being different from a master key, the master key configured to perform the encryption, wherein the virtual user identifier is further based on a session identifier specific to the transaction, and wherein the virtual user identifier is based on a cumulative speech energy of the user in the speech, and wherein the cumulative speech energy is a total energy involved in the conversation before the user enters or speaks out the user identifier.

9. The computer implemented method of claim 8, further comprising:
performing a cipher block chaining message authentication code (CBCMAC) on the sensitive information to obtain a tag; and
performing format preserving encryption on the sensitive information to generate the virtual user identifier based on a counter value derived from the cumulative speech energy of the user in the speech, and the tag.

10. The computer implemented method of claim 7, wherein the virtual user identifier is generated as at least one of a speech of the user and DTMF tones each time the user performs a transaction or initiates a query for processing.

11. The computer implemented method of claim 7, wherein the sensitive information is extracted using a keyword spotting technique.

12. The computer implemented method of claim 7, further comprising:
computing a score for the speech obtained in real time;
performing a comparison of the score with a corresponding user speech model each time the user performs a transaction or initiates a query for processing, wherein the corresponding user speech model is obtained from an external entity authorized by an issuing entity to store speech models of one or more users; and
triggering an action based on the comparison, wherein the action comprises a notification message being communicated to a communication device associated with the user, wherein the user is authenticated when the score is greater than a predefined threshold.

13. One or more non-transitory machine readable information storage mediums comprising one or more instructions which when executed by one or more hardware processors causes the one or more hardware processors to perform a method comprising:
obtaining, in real time, using a sensitive information processor, a first input and a second input, the first input being a conversation, the conversation comprising at least one of a recorded user speech and a speech energy involved in the conversation, and the second input being sensitive information associated with a user and obtained via at least one of speech and dual tone multi frequency (DTMF) tones, the speech and the DTMF tones corresponding to an identity associated with the user, and wherein the sensitive information corresponds to at least one of user details, a credit card number, a card verification value (CVV) number and an account number;
extracting, in real time, sensitive information specific to the identity of the user from the first input and the second input; and
generating, in real time, a virtual user identifier corresponding to the sensitive information using a corresponding user speech model when the user performs the transaction or initiates the query for processing, wherein the virtual user identifier is generated by:
extracting (i) a first set of letters from the first input and the second input present in the identity, and (ii) a second set of letters from the first input and the second input to obtain the sensitive information,
generating a remapping table based on the first set of letters and the second set of letters, and
rearranging, by the remapping table, the sensitive information to generate the virtual user identifier for performing at least one of a transaction and initiating the query for processing, wherein the virtual user identifier is specific to the transaction being performed by the user or the query initiation in real time.

* * * * *